United States Patent
Hughes

(10) Patent No.: US 8,811,431 B2
(45) Date of Patent: Aug. 19, 2014

(54) SYSTEMS AND METHODS FOR COMPRESSING PACKET DATA

(75) Inventor: David Anthony Hughes, Los Altos, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 321 days.

(21) Appl. No.: 12/313,618

(22) Filed: Nov. 20, 2008

(65) Prior Publication Data

US 2010/0124239 A1   May 20, 2010

(51) Int. Cl.
*H04J 3/18* (2006.01)
*H04L 29/06* (2006.01)

(52) U.S. Cl.
CPC ..................... *H04L 69/04* (2013.01)
USPC ......................................................... 370/477

(58) Field of Classification Search
CPC ............................. H04L 69/04; H04L 67/2828
USPC ........... 370/229–321, 464, 477; 709/246, 247
See application file for complete search history.

(56) References Cited

U.S. PATENT DOCUMENTS

| | | | |
|---|---|---|---|
| 5,307,413 A * | 4/1994 | Denzer ........................ | 713/151 |
| 5,359,720 A | 10/1994 | Tamura et al. | |
| 5,483,556 A * | 1/1996 | Pillan et al. .................... | 375/340 |
| 5,592,613 A | 1/1997 | Miyazawa et al. | |
| 5,611,049 A | 3/1997 | Pitts | |
| 5,675,587 A | 10/1997 | Okuyama et al. | |
| 5,754,774 A | 5/1998 | Bittinger et al. | |
| 5,802,106 A | 9/1998 | Packer | |
| 5,883,891 A | 3/1999 | Williams et al. | |
| 6,000,053 A | 12/1999 | Levine et al. | |
| 6,003,087 A | 12/1999 | Housel et al. | |
| 6,081,883 A | 6/2000 | Popelka et al. | |
| 6,295,541 B1 | 9/2001 | Bodnar et al. | |
| 6,308,148 B1 | 10/2001 | Bruins et al. | |
| 6,311,260 B1 | 10/2001 | Stone et al. | |
| 6,374,266 B1 | 4/2002 | Shnelvar | |
| 6,434,662 B1 | 8/2002 | Greene et al. | |
| 6,438,664 B1 | 8/2002 | McGrath et al. | |
| 6,452,915 B1 | 9/2002 | Jorgensen | |
| 6,587,985 B1 | 7/2003 | Fukushima et al. | |
| 6,618,397 B1 | 9/2003 | Huang | |
| 6,633,953 B2 | 10/2003 | Stark | |
| 6,643,259 B1 | 11/2003 | Borella et al. | |
| 6,650,644 B1 | 11/2003 | Colley et al. | |

(Continued)

FOREIGN PATENT DOCUMENTS

EP          1507353 A2    2/2005

OTHER PUBLICATIONS

Zhao et al.; "Analysis and Improvement on IPSEC Anti-Replay Window Protocol"; 2003; IEEE' pp. 553-558.

(Continued)

*Primary Examiner* — Chi Pham
*Assistant Examiner* — Robert Lopata
(74) *Attorney, Agent, or Firm* — Carr & Ferrell LLP

(57) ABSTRACT

A system, method, and computer program for compressing packet data is provided. In exemplary embodiments, one or more blocks may be identified that include block data similar to packet data of one or more packets. The one or more blocks may comprise archives of previously transferred packets. The packet data may be compressed based, at least partially, on the block data. Accordingly, the compressed packet data may be transferred over a communication network.

21 Claims, 8 Drawing Sheets

(56) References Cited

U.S. PATENT DOCUMENTS

| | | |
|---|---|---|
| 6,667,700 B1 | 12/2003 | McCanne et al. |
| 6,674,769 B1 | 1/2004 | Viswanath |
| 6,718,361 B1 | 4/2004 | Basani et al. |
| 6,738,379 B1 | 5/2004 | Balazinski et al. |
| 6,769,048 B2 | 7/2004 | Goldberg et al. |
| 6,791,945 B1 | 9/2004 | Levenson et al. |
| 6,856,651 B2 | 2/2005 | Singh |
| 6,859,842 B1 | 2/2005 | Nakamichi et al. |
| 6,910,106 B2 | 6/2005 | Sechrest et al. |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagaranjan et al. |
| 7,035,214 B1 | 4/2006 | Seddigh et al. |
| 7,069,342 B1* | 6/2006 | Biederman .............. 709/247 |
| 7,113,962 B1 | 9/2006 | Kee et al. |
| 7,120,666 B2 | 10/2006 | McCanne et al. |
| 7,145,889 B1 | 12/2006 | Zhang et al. |
| 7,197,597 B1 | 3/2007 | Scheid et al. |
| 7,200,847 B2 | 4/2007 | Straube et al. |
| 7,215,667 B1 | 5/2007 | Davis |
| 7,242,681 B1* | 7/2007 | Van Bokkelen et al. ...... 370/389 |
| 7,243,094 B2 | 7/2007 | Tabellion et al. |
| 7,266,645 B2 | 9/2007 | Garg et al. |
| 7,318,100 B2 | 1/2008 | Demmer et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie et al. |
| 7,389,393 B1 | 6/2008 | Karr et al. |
| 7,417,991 B1 | 8/2008 | Crawford et al. |
| 7,420,992 B1* | 9/2008 | Fang et al. .................. 370/477 |
| 7,428,573 B2 | 9/2008 | McCanne et al. |
| 7,451,237 B2* | 11/2008 | Takekawa et al. ............ 709/247 |
| 7,453,379 B2* | 11/2008 | Plamondon .................... 341/87 |
| 7,457,315 B1* | 11/2008 | Smith ............................ 370/473 |
| 7,471,629 B2 | 12/2008 | Melpignano |
| 7,532,134 B2* | 5/2009 | Samuels et al. ................. 341/87 |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,619,545 B2* | 11/2009 | Samuels et al. ................. 341/51 |
| 7,620,870 B2* | 11/2009 | Srinivasan et al. ........... 714/748 |
| 7,624,446 B1 | 11/2009 | Wilhelm |
| 7,630,295 B2 | 12/2009 | Hughes et al. |
| 7,639,700 B1* | 12/2009 | Nabhan et al. ................ 370/401 |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,714,747 B2* | 5/2010 | Fallon ............................. 341/51 |
| 7,746,781 B1 | 6/2010 | Xiang |
| 7,764,606 B1 | 7/2010 | Ferguson et al. |
| 7,849,134 B2 | 12/2010 | McCanne et al. |
| 7,853,699 B2 | 12/2010 | Wu et al. |
| 7,873,786 B1 | 1/2011 | Singh et al. |
| 7,941,606 B1 | 5/2011 | Pullela et al. |
| 7,945,736 B2 | 5/2011 | Hughes et al. |
| 7,948,921 B1 | 5/2011 | Hughes et al. |
| 7,953,869 B2 | 5/2011 | Demmer et al. |
| 8,069,225 B2 | 11/2011 | McCanne et al. |
| 8,095,774 B1 | 1/2012 | Hughes et al. |
| 8,140,757 B1 | 3/2012 | Singh et al. |
| 8,171,238 B1 | 5/2012 | Hughes et al. |
| 8,225,072 B2 | 7/2012 | Hughes et al. |
| 8,307,115 B1 | 11/2012 | Hughes |
| 8,312,226 B2 | 11/2012 | Hughes |
| 8,370,583 B2 | 2/2013 | Hughes |
| 8,392,684 B2 | 3/2013 | Hughes |
| 8,442,052 B1 | 5/2013 | Hughes |
| 8,473,714 B2 | 6/2013 | Hughes et al. |
| 8,489,562 B1 | 7/2013 | Hughes et al. |
| 8,595,314 B1 | 11/2013 | Hughes |
| 2001/0054084 A1 | 12/2001 | Kosmynin |
| 2002/0007413 A1 | 1/2002 | Garcia-Luna-Aceves et al. |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0078242 A1* | 6/2002 | Viswanath ...................... 709/247 |
| 2002/0101822 A1 | 8/2002 | Ayyagari et al. |
| 2002/0107988 A1* | 8/2002 | Jordan ............................ 709/247 |
| 2002/0116424 A1* | 8/2002 | Radermacher et al. ........ 708/203 |
| 2002/0131434 A1 | 9/2002 | Vukovic et al. |
| 2002/0150041 A1 | 10/2002 | Reinshmidt et al. |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0123481 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0179542 A1 | 9/2004 | Murakami et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0190694 A1 | 9/2005 | Ben-Nun et al. |
| 2005/0210151 A1* | 9/2005 | Abdo et al. .................... 709/247 |
| 2005/0220019 A1 | 10/2005 | Melpignano |
| 2005/0235119 A1 | 10/2005 | Sechrest et al. |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0286526 A1 | 12/2005 | Sood et al. |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0143497 A1 | 6/2006 | Zohar et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0011424 A1 | 1/2007 | Sharma et al. |
| 2007/0038815 A1 | 2/2007 | Hughes |
| 2007/0038816 A1 | 2/2007 | Hughes et al. |

(56) References Cited

U.S. PATENT DOCUMENTS

| | | |
|---|---|---|
| 2007/0038858 A1 | 2/2007 | Hughes |
| 2007/0050475 A1 | 3/2007 | Hughes |
| 2007/0076693 A1 | 4/2007 | Krishnaswamy |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0174428 A1 | 7/2007 | Lev Ran et al. |
| 2007/0195702 A1 | 8/2007 | Yuen et al. |
| 2007/0198523 A1 | 8/2007 | Hayim |
| 2007/0226320 A1 | 9/2007 | Hager et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0263554 A1 | 11/2007 | Finn |
| 2007/0276983 A1 | 11/2007 | Zohar et al. |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0095060 A1 | 4/2008 | Yao |
| 2008/0133536 A1* | 6/2008 | Bjorner et al. ............... 707/10 |
| 2008/0184081 A1 | 7/2008 | Hama et al. |
| 2008/0229137 A1* | 9/2008 | Samuels et al. ............ 713/600 |
| 2008/0243992 A1 | 10/2008 | Jardetzky et al. |
| 2008/0313318 A1 | 12/2008 | Vermeulen et al. |
| 2008/0320151 A1 | 12/2008 | McCanne et al. |
| 2009/0060198 A1* | 3/2009 | Little ......................... 380/278 |
| 2009/0100483 A1 | 4/2009 | McDowell |
| 2009/0158417 A1 | 6/2009 | Khanna et al. |
| 2009/0175172 A1 | 7/2009 | Prytz et al. |
| 2009/0234966 A1* | 9/2009 | Samuels et al. ............ 709/231 |
| 2009/0265707 A1 | 10/2009 | Goodman et al. |
| 2009/0279550 A1 | 11/2009 | Romrell et al. |
| 2010/0005222 A1 | 1/2010 | Brant et al. |
| 2010/0011125 A1* | 1/2010 | Yang et al. ................. 709/247 |
| 2010/0020693 A1 | 1/2010 | Thakur |
| 2010/0070605 A1 | 3/2010 | Hughes et al. |
| 2010/0115137 A1* | 5/2010 | Kim et al. .................. 709/247 |
| 2010/0131957 A1 | 5/2010 | Kami |
| 2010/0290364 A1* | 11/2010 | Black ......................... 370/253 |
| 2010/0318892 A1 | 12/2010 | Teevan et al. |
| 2011/0154329 A1 | 6/2011 | Arcese et al. |
| 2011/0219181 A1 | 9/2011 | Hughes et al. |
| 2012/0036325 A1 | 2/2012 | Mashtizadeh et al. |
| 2012/0221611 A1 | 8/2012 | Watanabe et al. |
| 2012/0239872 A1 | 9/2012 | Hughes et al. |
| 2013/0094501 A1 | 4/2013 | Hughes |
| 2013/0117494 A1 | 5/2013 | Hughes et al. |
| 2013/0282970 A1 | 10/2013 | Hughes et al. |

OTHER PUBLICATIONS

Singh et al. ;" Future of Internet Security—IPSEC"; 2005; pp. 1-8.
"Muthitacharoen, Athicha et al.,""A Low-bandwidth Network File System,"" 2001, in Proc. ofthe 18th ACM Symposium on Operating Systems Principles, Banff, Canada, pp. 174-187."
Shared LAN Cache Datasheet, 1996, http://www.lancache.com/slcdata.htm.
""""A protocol-independent technique for eliminating redundant network traffic"", ACM SIGCOMM Computer CommunicationReview, vol. 30, Issue 4 (Oct. 2000) pp. 87-95, Year of Publication: 2000".
"B. Hong, D. Plantenberg, D. D. E. Long, and M. Sivan-Zimet. ""Duplicate data elimination in a SAN file system"", InProceedings of the 21 st Symposium on Mass Storage Systems (MSS '04), Goddard, MD, Apr. 2004. IEEE."
"You, L. L. And Karamanolis, C. 2004. ""Evaluation of efficient archival storage techniques"", In Proceedings of the 21 st IEEESymposium on Mass Storage Systems and Technologies (MSST)."
"Fred Douglis and Arun lyengar, Application specific Delta-encoding via Resemblance Detection, Published in the 2003 USENIXAnnual Technical Conference."
"You L. L. et al., ""Deep Store an Archival Storage System Architecture"" Data Engineering, 2005. ICDE 2005. Proceedings. 21st.inti Conf on Tokyo, Japan, Apr. 5-8, 2005, pp. 12".
"Udi Manber. ""Finding Similar Files in a Large File System"", TR 93-33 Oct. 1994, Department of Computer Science,University of Arizona. http://webglimpse.net/pubs/TR93-33.pdf. Also appears in the 1994 winter USENIX Technical Conference." .
Knutsson, Bjorn et al., "Transparent Proxy Signalling", Journal of Communications and Networks, vol. 3, No. 2, Jun. 2001.
Request for Trial Granted, Jan. 2, 2014, U.S. Appl. No. 11/202,697, filed Aug. 12, 2005.
Allowance, Oct. 23, 2012, U.S. Appl. No. 11/202,697, filed Aug. 12, 2005.
Decision on Appeal, Sep. 17, 2012, U.S. Appl. No. 11/202,697, filed Aug. 12, 2005.
Examiner's Answer to Appeal Brief, Oct. 27, 2009, U.S. Appl. No. 11/202,697, filed Aug. 12, 2005.
Request for Trial Granted, Jan. 2, 2014, U.S. Appl. No. 11/240,110, filed Sep. 29, 2005.
Allowance, Aug. 30, 2012, U.S. Appl. No. 11/240,110, filed Sep. 29, 2005.
Decision on Appeal, Jun. 28, 2012, U.S. Appl. No. 11/240,110, Sep. 29, 2005.
Examiner's Answer to Appeal Brief, Oct. 27, 2009, U.S. Appl. No. 11/240,110, filed Sep. 29, 2005.
Allowance, Apr. 28, 2009, U.S. Appl. No. 11/357,657, filed Feb. 16, 2006.
Allowance Sep. 8, 2009, U.S. Appl. No. 11/263,755, filed Oct. 31, 2005.
Final, May 11, 2009, U.S. Appl. No. 11/263,755, filed Oct. 31, 2005.
Allowance, Feb. 14, 2014, U.S. Appl. No. 11/498,473, filed Aug. 2, 2006.
Non-Final, Jul. 10, 2013, U.S. Appl. No. 11/498,473, filed Aug. 2, 2006.
Final, Aug. 12, 2011, U.S. Appl. No. 11/498,473, filed Aug. 2, 2006.
Advisory, Oct. 2, 2009, U.S. Appl. No. 11/498,473, filed Aug. 2, 2006.
Non-Final, Oct. 9, 2013, U.S. Appl. No. 11/498,491, filed Aug. 2, 2006.
Advisory, Jul. 16, 2013, U.S. Appl. No. 11/498,491, filed Aug. 2, 2006.
Allowance, Dec. 26, 2012, U.S. Appl. No. 11/497,026, filed Jul. 31, 2006.
Decision on Appeal, Nov. 14, 2012, U.S. Appl. No. 11/497,026, filed Jul. 31, 2006.
Examiner's Answer to Appeal Brief, Oct. 14, 2009, U.S. Appl. No. 11/497,026, filed Jul. 31, 2006.
Allowance, Dec. 3, 2009, U.S. Appl. No. 11/796,239, filed Apr. 27, 2007.
Allowance, Jan. 16, 2014, U.S. Appl. No. 12/217,440, filed Jul. 3, 2008.
Non-Final, Aug. 14, 2013, U.S. Appl. No. 12/217,440, filed Jul. 3, 2008.
Advisory, Jan. 29, 2013, U.S. Appl. No. 12/217,440, filed Jul. 3, 2008.
Advisory, Jul. 2, 2012, U.S. Appl. No. 12/217,440, filed Jul. 3, 2008.
Allowance Feb. 29, 2012, U.S. Appl. No. 11/825,440, filed Jul. 5, 2007.
Allowance, Nov. 12, 2011, U.S. Appl. No. 11/825,497, filed Jul. 5, 2007.
Allowance, Feb. 11, 2011, U.S. Appl. No. 11/903,416, filed Sep. 20, 2007.
Allowance, May 14, 2013, U.S. Appl. No. 11/998,726, filed Nov. 30, 2007.
Advisory, May 23, 2011, U.S. Appl. No. 11/998,726, filed Nov. 30, 2007.
Allowance, Mar. 21, 2013, U.S. Appl. No. 12/070,796, filed Feb. 20, 2008.
Allowance, Mar. 16, 2012, U.S. Appl. No. 12/151,839, filed May 8, 2008.

(56) References Cited

OTHER PUBLICATIONS

Allowance, Jan. 20, 2011, U.S. Appl. No. 12/622,324, filed Nov. 19, 2009.
Allowance, Dec. 9, 2010, U.S. Appl. No. 12/622,324, filed Nov. 19, 2009.
Allowance, Mar. 26, 2012, U.S. Appl. No. 13/112,936, filed May 20, 2011.
Advisory, Dec. 3, 2013, U.S. Appl. No. 13/288,691, filed Nov. 3, 2011.
Final, Sep. 26, 2013, U.S. Appl. No. 13/288,691, filed Nov. 3, 2011.
Non-Final, May 20, 2013, U.S. Appl. No. 13/288,691, filed Nov. 3, 2011.
Non-Final, Oct. 22, 2013, U.S. Appl. No. 13/274,162, filed Oct. 14, 2011.
Allowance, Jan. 2, 2014, U.S. Appl. No. 13/427,422, filed Mar. 22, 2012.
Advisory, Sep. 27, 2013, U.S. Appl. No. 13/427,422, filed Mar. 22, 2012.
Final, Jul. 17, 2013, U.S. Appl. No. 13/427,422, filed Mar. 22, 2012.
Advisory, Jan. 24, 2013, U.S. Appl. No. 13/427,422, filed Mar. 22, 2012.
Allowance, Feb. 19, 2013, U.S. Appl. No. 13/482,321, filed May 29, 2012.
Allowance, Sep. 26, 2013, U.S. Appl. No. 13/517,575, filed Jun. 13, 2012.
Advisory, Apr. 4, 2013, U.S. Appl. No. 13/517,575, filed Jun. 13, 2012.
Allowance, Jan. 3, 2014, U.S. Appl. No. 13/757,548, filed Feb. 1, 2013.
Non-Final, Jan. 3, 2014, U.S. Appl. No. 13/757,548, filed Feb. 1, 2013.
Allowance, Nov. 25, 2013, U.S. Appl. No. 13/917,517, filed Jun. 13, 2013.
Non-Final, Aug. 14, 2013, U.S. Appl. No. 13/917,517, filed Jun. 13, 2013.
Newton, "Newton's Telecom Dictionary", 17th Ed., 2001, pp. 38, 201, and 714.
Definition memory (n), Webster's Third New International Dictionary, Unabridged (1993), available at <http://lionreference.chadwyck.com> (Dictionaries/Webster's Dictionary).
Definition appliance, 2c, Webster's Third New International Dictionary, Unabridged (1993), available at <http://lionreference.chadwyck.com> (Dictionaries/Webster's Dictionary).

* cited by examiner

SYSTEMS AND METHODS FOR COMPRESSING PACKET DATA

CROSS-REFERENCE TO RELATED APPLICATIONS

This application is related to U.S. patent application Ser. No. 11/240,110, filed Sep. 29, 2005, entitled "Network Memory Appliance for Providing Data Based on Local Accessibility," as well as U.S. patent application Ser. No. 11/998,726, filed Nov. 30, 2007, entitled "Deferred Data Storage," both of which are incorporated herein by reference.

BACKGROUND

1. Field of the Invention

The present invention is generally related to computer networks. More particularly, the present invention is related to systems and methods for compressing packet data.

2. Related Art

Presently, data compression is useful in many applications. One example is in storing data. As data is compressed to a greater extent, more and more information can be stored on a given storage device. Another example is in transferring data across a communication network. As bandwidth in communication networks is generally viewed as a limited resource, minimizing a size of units of data being sent across the communication network may increase performance of the communication network.

One class of data compression is known as lossless data compression. Lossless data compression allows exact copies of original data to be reconstructed from compressed data. Lossless data compression is used, for example, in the popular ZIP file format and in the Unix tool gzip. Additionally, some image file formats, such as PNG or GIF, use lossless data compression.

A popular technique for lossless data compression is known as LZ77. The basis for LZ77 was developed in 1977 by Abraham Lempel and Jacob Ziv. LZ77 is a substitutional compression algorithm, which operates by effectively identifying repeated patterns in an original version of a data file (or other unit of data) to be compressed, removing the repeated patterns, and inserting pointers to previous occurrences of the repeated patterns in the data file. The pointers may each include a pair of numbers called a 'length-distance pair,' which may sometimes be referred to as a 'length-offset pair.' The length may specify a length of a repeated pattern being removed, whereas the distance or offset may be indicative of a separation between the first occurrence of the repeated pattern and a subsequent occurrence of the repeated pattern being removed. The length and distance may be provided in various manners such as in bytes or characters. The resulting compressed data file may be significantly smaller than the original version of the data file. However, the compressed data file can be decompressed such that the resulting data file is an exact copy of the original version of the data file.

A degree of compression may be expressed as a ratio of a size in bytes of the original version of the data file to a size in bytes of the compressed data file. A factor that affects the degree of compression attainable in substitutional compression methods, such as LZ77, is repetitiveness of the data to be compressed. In other words, more repetitive data can be compressed to a greater degree relative to less repetitive data because there are more occurrences of repeated patterns. Statistically speaking, larger data files are more repetitive than smaller data files. Thus, larger data files can generally be compressed to a greater degree relative to smaller data files using existing methods.

Commonly, data that is transferred across communication networks is divided into packets, also known as datagrams. A packet may be described as a unit of information transmitted as a whole from one device to another via a communication network. In packet switching networks, for example, a packet may be described as a transmission unit of fixed maximum size that consists of binary digits representing both data and a header. The header may contain an identification number, source and destination addresses, and error-control data. To illustrate, a file may be sent by a sending device on one side of a communication network to a receiving device on another side of the communication network. Prior or concurrent to sending, the file may be divided into packets. Subsequently, the packets may be received and reassembled by the receiving device to obtain the file.

Lossless data compression methods exist for compressing data from individual packets, such as IP payload compression protocol (IPComp) defined in RFC 3173. Since packets may be dropped or received out of order, these methods are not interdependent on other packets being sent. IPComp, for instance, compresses a given packet based on repetitive data included in that given packet. In other words, pointers of a compressed version of the given packet only point within the given packet. Because packets typically include a relatively small amount of data, the degree to which the packets can be compressed using IPComp and other existing methods may be limited as explained above.

SUMMARY OF THE INVENTION

Embodiments of the present invention overcome or substantially alleviate prior problems associated with compressing packet data. In exemplary embodiments, one or more blocks are identified that include data (i.e., block data) similar to data within a packet (i.e., packet data). The packet may have been intercepted, such as by a network memory device, after the packet was sent from a first computer and directed to a second computer over a communication network. In some embodiments, the block data may comprise archives of previously transferred packet data. Additionally, the one or more blocks may be stored in network memory and the packet data may comprise data from a plurality of packets according to various embodiments.

The packet data may be compressed based, at least partially, on the block data. In some embodiments, the packet data may be appended, either physically or virtually, to the block data. Furthermore, LZ encoding may be invoked in exemplary embodiments.

Accordingly, the compressed packet data may be transferred over a communication network to the second computer. Prior to reaching the second computer, the compressed packet data may be intercepted, such as by a second network memory device. The one or more blocks on which compression was based may then be retrieved by the second network memory device based on the compressed packet data. The compressed packet data may then be decompressed based on the one or more blocks. Finally, the decompressed packet data may be transferred to the second computer.

DETAILED DESCRIPTION OF THE INVENTION

Embodiments of the present invention provide systems and methods for compressing packet data included in packets sent across a communication network. According to some embodiments, a contiguous transmission control protocol (TCP) stream comprises the packets. Additionally, the present invention may allow the parallel processing of packet data from multiple packets across many CPUs without interdependence between the CPSs. In exemplary embodiments, the packet data is compressed based on information that has been previously transferred across the communication network. The previously transferred information may be locally accessible and verified for consistency at both a source site and a destination site. Since the packet data is compressed based on this information, rather than only on data included in each packet, the degree of compression that can be achieved is greatly increased. Additionally, this information may be stored as blocks in a network memory to further enhance performance. Embodiments of the present invention may be practiced on any device that is configured to transfer packets via a communication network and configured to store or access data that has been previously transferred. While some embodiments of the present invention will be described in reference to operation on a network memory appliance, the present invention may be practiced on any device.

Figure 1:
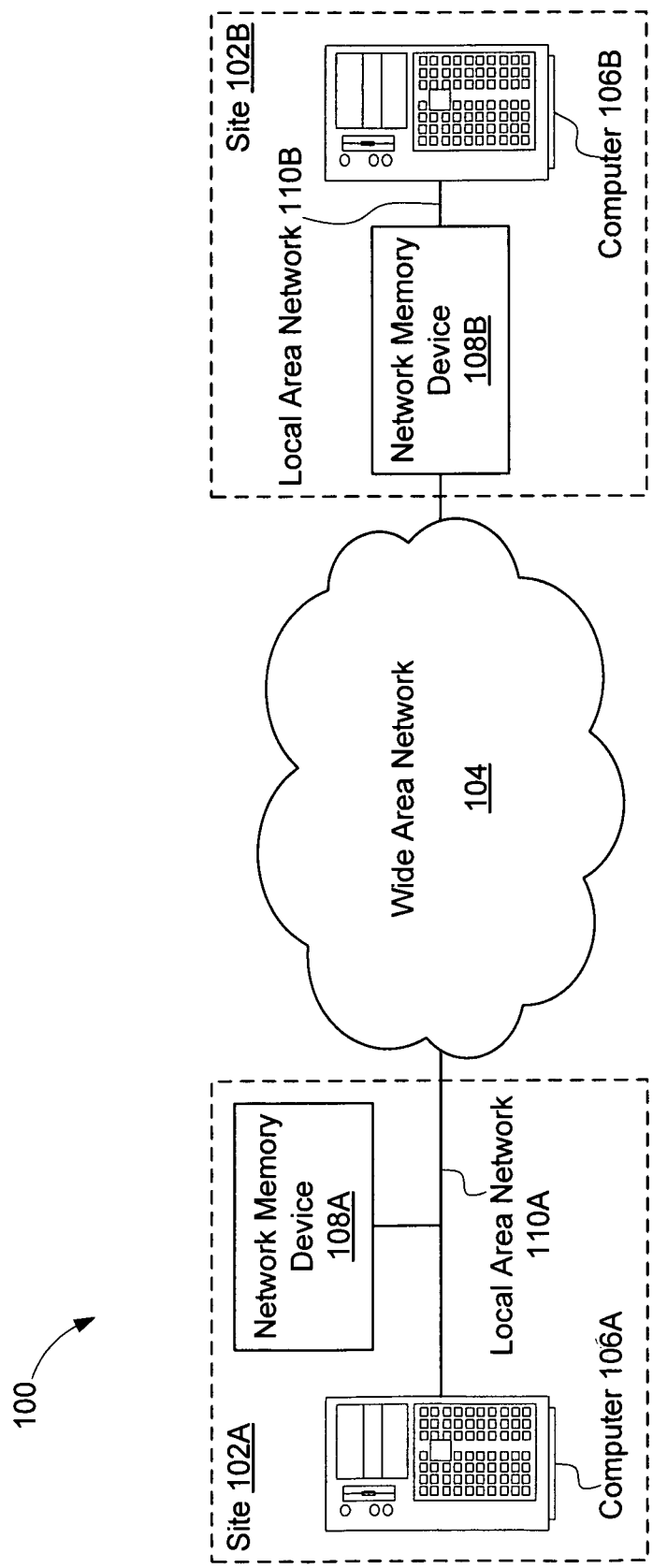
FIG. 1 is a block diagram of an exemplary environment for compressing packet data.

FIG. 1 is a block diagram of an exemplary environment 100 for compressing packet data. As depicted, the environment 100 includes site 102A in communication with site 102B via a wide area network (WAN) 104. Although only two sites, the site 102A and the site 102B, are shown in FIG. 1, the environment 100 may comprise three or more sites and still fall within the scope of embodiments of the present invention. The site 102A includes a computer 106A and a network memory device 108A coupled by a local area network (LAN) 110A. Similarly, the site 102B includes a computer 106B and a network memory device 108B coupled by a local area network 110B. In various embodiments, the sites 102A and 102B may further include a router or switch (not shown). The router or switch may, for example, facilitate communication between the local area network 110A and the wide area network 104, and between the local area network 110B and the wide area network 104. Other networking hardware may also be included in the sites 102A and 102B, as will be appreciated by those skilled in the art.

The sites 102A and 102B may comprise physical locations, such as offices, office complexes, stores, homes, and other locally networked sites. The sites 102A and 102B may transfer data therebetween via the wide area network 104. The data may include data base entries, emails, documents, and any other digitized items. In some embodiments, an application may run at one site and be accessed from another site. In such cases, application data may be transferred between the sites 102A and 102B. As discussed further herein, the data transferred between the sites 102A and 102B may be included in packets.

The wide area network 104 may comprise a private network (e.g., a leased line network) or a public network (e.g., the Internet). The wide area network 104 may include hardware and/or software elements that enable the exchange of information (e.g., voice and data) between the site 102A and the site 102B. Routers or switches may be used to connect the wide area network 104 with the sites 102A and 102B, and local area networks thereof (e.g., the local area networks 110A and 110B).

The computers 106A and 106B may comprise a server, a client, a workstation, other computing devices, or the like. In some embodiments, the computers 106A and 106B may comprise other computing devices such as a personal digital assistant (PDA), a Smartphone, a pocket PC, and other various handheld or mobile devices. In some embodiments, one or both of the computers 106A and 106B may be substituted by a plurality of computers (not shown). In one embodiment, the plurality of computers may be located at one physical locale and be in communication with one or more network memory devices (e.g., the network memory devices 108A and 108B) at the same physical locale. In accordance with some embodiments, one or more computers (e.g., the computers 106A and 106B) may be integrated with one or more network memory devices (e.g., the network memory devices 108A and 108B) as single systems.

According to exemplary embodiments, the network memory devices 108A and 108B, as well as any other network memory devices included in the environment 100, provide a 'network memory' to reduce the amount of information traversing the wide area network 104. In one example, the network memory reduces the amount of information traversing the wide area network 104 by one or more orders of magnitude enabling LAN-like performance of the wide area network 104. This may be achieved by eliminating a need to send data over the wide area network 104 that has been previously sent. Additional information related to various exemplary embodiments of the network memory devices 108A and 108B may be found in U.S. patent application Ser. No. 11/240,110, entitled "Network Memory Appliance for Providing Data Based on Local Accessibility," which has been incorporated herein by reference.

To illustrate network memory in accordance with various embodiments, an example involving the environment 100 is considered. As packets flow through the local area network 110A, the network memory device 108A intercepts the packets and stores a copy of data included in the packets (i.e., packet data) as a local instance within the site 102A. Similarly, the network memory device 108B intercepts packets flowing through the local area network 110B and stores a copy of data included in those packets (i.e., packet data) as a local instance within the site 102B. Therefore, if a particular packet, or data therefrom, is transferred from the computer 106A to the computer 106B, or vice versa, a copy of data included in that particular packet is stored by the network memory devices 108A and 108B within the sites 102A and 102B, respectively.

Continuing with the above example, the site 102A may act as a source site, while the site 102B may act as a destination site. It will be appreciated, however, that both sites 102A and 102B can act simultaneously as source and destination sites. A given packet may be sent from the computer 106A and be directed to the computer 106B. The given packet may be intercepted by the network memory device 108A, which will determine whether data within the given packet matches data stored as a local instance within the site 102B. If the data within the given packet does match data stored as a local instance at the site 102B, there may be no need to resend the given packet over the wide area network 104. Instead, the network memory device 108A may generate instructions to obtain the data within the given packet locally and send the instructions to the network memory device 108B. The data within the given packet may then be delivered to the computer 106B without the data within the given packet actually traversing the wide area network 104.

The network memory devices 108A and 108B may comprise one or more of a communications interface, a processor, a memory, or storage. Exemplary embodiments of the network memory devices 108A and 108B are discussed in connection with FIG. 7. In some embodiments, the network memory devices 108A and 108B may be referred to as 'network memory appliances,' or simply 'appliances.'

Furthermore, the network memory device 108A or 108B may be installed in-path (as depicted in FIG. 1 with respect to the network memory device 108A) or out-of-path (as depicted in FIG. 1 with respect to the network memory device 108B) in the local area networks 110A and 110B. The term 'in-path,' which may also be referred to as 'in-line,' describes installation configurations in which a device (e.g., the network memory devices 108A and 108B) is physically attached between two communication lines that make up some portion of the local area network. As such, for in-line installations, the network memory device 108B may be installed between one or more computers 106B and a router or switch (not shown) so that any data that flows through the local area network 110B will necessarily flow through the network memory device.

The term 'out-of-path,' on the other hand, describes installation configurations in which a device (e.g., the network memory devices 108A) taps into the local area network, but is not physically attached between two communication lines. In one embodiment where the network memory device 108A is installed out-of-path, the network memory device 108A is coupled to a router (not shown). A number of router protocols, such as web cache communication protocol (WCCP) and various protocols related to policy based routing (PBR), may allow the router to transparently route network traffic to the network memory device 108A.

The local area networks 110A and 110B may cover a relatively small geographic range, such the sites 102A and 102B, and comprise one or more of a wired network (e.g., Ethernet) or a wireless network (e.g., Wi-Fi). The local area networks 110A and 110B may include hardware and/or software elements that enable the exchange of information (e.g., voice and data) between various computers 106A and 106B, devices (e.g., the network memory devices 108A and 108B), and other networking components, such as routers and switches (not shown).

Figure 2:
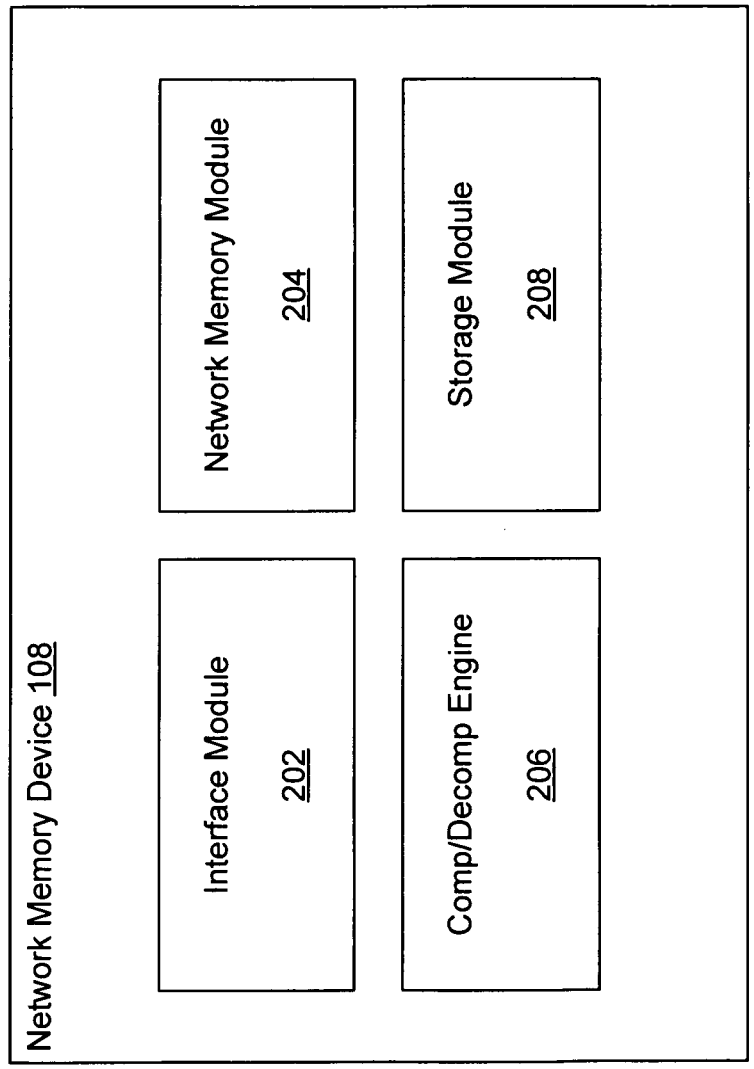
FIG. 2 illustrates an exemplary network memory device.

FIG. 2 illustrates the exemplary network memory device 108. The network memory device 108 may be similar to one or both of the network memory devices 108A and 108B. The network memory device 108 may include an interface module 202, a network memory module 204, a compression/decompression (comp/decomp) engine 206, and a storage module 208. Although FIG. 2 describes the network memory device 108 as including various modules and engines, fewer or more modules and engines may be included in the network memory device 108 and still fall within the scope of various embodiments. Additionally, various modules and engines of the network memory device 108 may be combined into a single module or engine. For example, functionalities of the network memory module 204 and the storage module 208 may be combined into one module.

The interface module 202 may be configured to facilitate communication between the network memory module 204, the compression/decompression engine 206, and the local area network (e.g., the local area network 110A or 110B). For example, information such as packets and packet data may be transferred to and from the network memory device 108 by the interface module 202. The interface module 202 may also intercept information such as packets traversing a communication network, as described herein. In exemplary embodiments, the interface module 202 may be further configured to communicate with a global management system (not shown). The global management system may configure, monitor, and manage the network memory device 108 in real-time.

The network memory module 204 may perform various tasks related to the network memory. For example, the network memory module 204 may be configured to store and retrieve copies of the packets, or data therefrom, intercepted by the interface module 202. Furthermore, information stored by the network memory module 204, such as the copies of the packets, or data therefrom, may be synchronized with that of other network memory devices in communication via the wide area network 104. Synchronization of the information may occur continuously, periodically, or after certain prompts, such as the interface module 202 intercepting a packet of which a copy has not previously been stored by the network memory module 204. Exemplary methods for synchronizing the information stored by various network memory devices are described in U.S. patent application Ser. No. 11/998,726, entitled "Deferred Data Storage," which has been incorporated by reference.

In exemplary embodiments, the copies of the packets may be stored in blocks by the network memory module 204. Generally speaking, a block may be collection of consecutive bytes of data that are read from or written to a memory device (such as a disk) as a group. In some cases, the block may be further described as a unit of information comprising one or more of identification codes, data, or error-checking codes. In one embodiment, each of the blocks comprises 256 kB. Additionally, the blocks may be referred to as 'pages.'

The network memory module 204 may also be configured to determine 'locally accessible data' of other network memory devices. The locally accessible data of a given network memory device 108 may be described as data that is transferable to a computer by the given network memory device 108 without being transferred over the wide area network 104. Additionally, the locally accessible data may be stored internal to or external to the network memory devices 108. The network memory device 108 may maintain data structures which track which data is locally accessible at each site 102. In exemplary embodiments, the network memory device 108 may keep track of which blocks (e.g., 256 kB blocks or pages) are locally accessible at which sites 102.

The network memory module 204 may also be configured to generate instructions for other network memory devices to locally obtain data. For example, referring to FIG. 1, the interface module 202 of the network memory device 108A may intercept a transferred packet sent by the computer 106A directed to the computer 106B over the wide area network 104. The network memory module 204 of the network memory device 108A may determine that the locally accessible data of the network memory device 108B includes data included in the transferred packet. As such, the network memory module 204 of the network memory device 108A may generate an instruction to obtain the data included in the transferred packet locally and send only the instruction to the network memory device 108B. Using the instruction, the network memory module 204 of the network memory device 108B may locally obtain the data included in the transferred packet, and deliver the data included in the transferred packet to the computer 106B. This allows the computer 106A to send data associated with packets to the computer 106B without the actual packets traversing the wide area network 104 when the data associated with the packets has been previously transferred. Additionally, according to some embodiments, the instructions may include portions of the data included in the packets that are not locally accessible so that the data included in the packets can be reconstructed by the receiving network memory device, while still minimizing the total data traversing the wide area network 104.

The compression/decompression engine 206 may be configured to compress packet data from packets that are being sent from within the site that includes the network memory device 108 to a remote site across the wide area network 104. The compression/decompression engine 206 may be further configured to decompress the packet data from the packets that is received from the remote site. The compression and decompression of the packet may be based, at least partially, on block data from one or more blocks, as described further herein.

The storage module 208 may be configured to store various types of information. For example, the storage module 208 may store copies of the packets, or data therefrom, intercepted by the interface module 202 as local instances. The locally accessible data, in turn, may comprise the local instances and be stored by the storage module 208. The locally accessible data may be stored as blocks in exemplary embodiments. Additionally, the storage module 208 may be synchronized with storage modules of other network memory devices, as discussed herein.

In one example, again referring to FIG. 1, the interface module 202 of the network memory device 108A may intercept a transferred packet sent by the computer 106A directed to the computer 106B over the wide area network 104. The compression/decompression engine 206 of the network memory device 108A may compress the packet data from the transferred packet. The compressed packet data may then be transferred over the wide area network 104 to the network memory device 108B. Accordingly, the compression/decompression engine 206 of the network memory device 108B may decompress the compressed packet data to obtain the packet data from the transferred packet as originally send by the computer 106A. Exemplary methods for compressing and decompressing packets are described in connection with FIG. 3 and FIG. 4, respectively. Additionally, an exemplary embodiment of the compression/decompression engine 206 is discussed in connection with FIG. 5.

Figure 3:
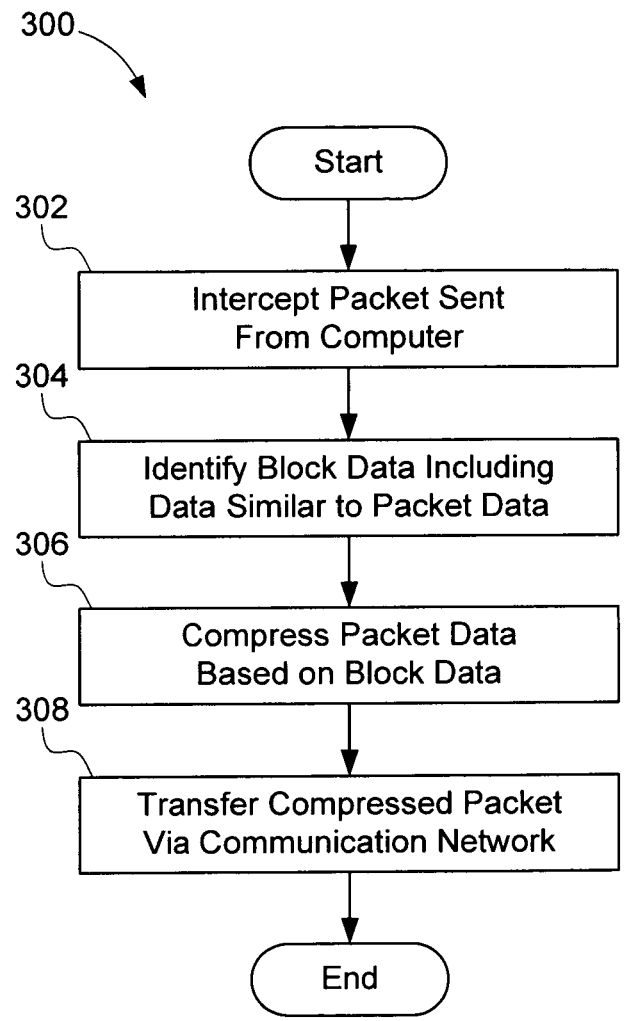
FIG. 3 is a flowchart showing an exemplary method for compressing packet data.

Now referring to FIG. 3, a flowchart showing a method 300 for compressing packet data according to exemplary embodiments is presented. The method 300 may be performed by the network memory device 108 or by modules therein, as described below. Additionally, steps of the method 300 may be performed in varying orders or concurrently. Furthermore, various steps may be added, subtracted, or combined in the method 300 and still fall within the scope of the present invention.

In step 302, a packet is intercepted after being sent from a computer. The packet may be intercepted while flowing through a local area network. For example, the interface module 202 of the network memory device 108A may intercept a packet sent from the computer 106A that is directed to the computer 106B. In exemplary embodiments, packets are intercepted transparently. Since the packets are intercepted transparently, the computers sending and receiving the packets (e.g., the computers 106A and 106B) will be unaware of the presence of the network memory device 108A and the interception of the packet. Put in other words, the computers 106A and 106B may send packets therebetween in exactly the same manner whether or not network memory devices (e.g., the network memory devices 108A and 108B) are present in the sites 102A and 102B. As such, no additional configuring is required of the computers 106A and 106B, or other hardware or software included in the sites 102A and 102B, in accordance with exemplary embodiments.

In step 304, one or more blocks are identified that include block data similar to packet data included in the packet being sent. In exemplary embodiments, the block data comprises archives of previously transferred packet data. For example, the block data may comprise packet data previously intercepted by the network memory device 108 as described in step 302. Additionally, the one or more blocks may be a part of the network memory. As described above, the network memory module 204 may store or locally access the one or more blocks in network memory. The compression/decompression engine 206 in conjunction with the network memory module 204 may identify the data in network memory similar to the packet data included in the packet. Furthermore, the one or more blocks may be identified based on data structures, such as hash tables, associated with the one or more blocks, as discussed further herein.

The block data that is similar to the packet data in the packet being sent may be included in the one or more blocks in various manners. According to various embodiments, the block data similar to the packet data may be arranged sequentially in the same order as the packet in the one or more blocks. In some embodiments, the block data similar to the packet data may be fragmented within the one or more blocks. Additionally, the block data similar to the packet data may represent a previous version of the packet data. The block data similar to the packet data may include all of the data included in the packet or a portion of the data included in the packet. In one embodiment, two consecutive blocks may include the block data similar to the packet data such that the packet data straddles the boundary of the two consecutive blocks (i.e., one part of the packet data is in the first of the two consecutive blocks and another part is in the second of the two consecutive blocks).

Additionally, the one or more blocks may be divided into sub-blocks in accordance with some embodiments. In one embodiment, the one or more blocks may each comprise 256 kB and be divided into 32 kB sub-blocks. In embodiments where two consecutive blocks include the block data similar to the packet data of the packet being sent such that the data straddles the boundary of the two consecutive blocks, the two consecutive blocks may be divided by excluding portions of the two consecutive blocks relatively far from the boundary that do not include any of the block data similar to the packet data.

In accordance with some embodiments, certain blocks maybe chronicled or cataloged in various manners. These certain blocks may be blocks that are frequently or recently identified, as in step 304. Copies of these certain blocks may be recorded in a dictionary or stored in a cache in various embodiments. The dictionary may provide an indication of a correspondence between specific packet data and the one or more blocks that include data similar thereto. The cache, in contrast, may store the one or more blocks for a limited amount of time. The limited amount of time may be predetermined or be a function of data flow (e.g., a first in, first out (FIFO) approach). Additionally, the network memory devices 108 may both locally store the dictionary or cache in the storage module 208. Accordingly, the dictionary or cache may be synchronized by the network memory devices 108. The synchronization of the dictionary or cache may be performed in a similar manner as the synchronization of the locally accessible data of the network memory devices 108, as described herein.

In step 306, the packet data is compressed based, at least partially, on the block data from the one or more blocks identified in step 304. In exemplary embodiments, the packet data may be compressed based partially on the block data and partially on the packet data itself. In other embodiments, the packet data may be compressed based on the sub-blocks described in connection with step 304. A lossless compression scheme or algorithm may be invoked such that the packet data originally included in the packet can be reconstructed. Generally speaking, lossless compression algorithms may exploit statistical redundancy in such a way as to represent the packet data more concisely without error. The block data similar to the packet data of the packet being sent identified in step 304 may provide statistical redundancy for the lossless compression scheme. According to one embodiment, LZ encoding (e.g., LZ77) may be used to compress the packet data based on the block data. A compressed packet may comprise the compressed version of the packet data originally included in the packet as well as information to identify the one or more blocks, or the block data therefrom, on which the compression of the packet data was, at least partially, based. Exemplary approaches for compressing the packet data are described further in connection with FIG. 5, FIG. 6A, and FIG. 6B.

In step 308, the compressed packet is transferred via a communication network. In exemplary embodiments, the interface module 202 may transfer the compressed packet via the communication network. The communication network may comprise one or more of a local area network (e.g., local area networks 110A and 110B) and a wide area network (e.g., the wide area network 104). In one example, packet data from a packet that was originally sent by the computer 106A and directed to the computer 106B, which in turn was subsequently intercepted, compressed by the network memory device 108A, and included in a compressed packet, may be transferred to the site 102B via the wide area network 104. Accordingly, the compressed packet may be received by the site 102B, as discussed in connection with FIG. 4.

Figure 4:
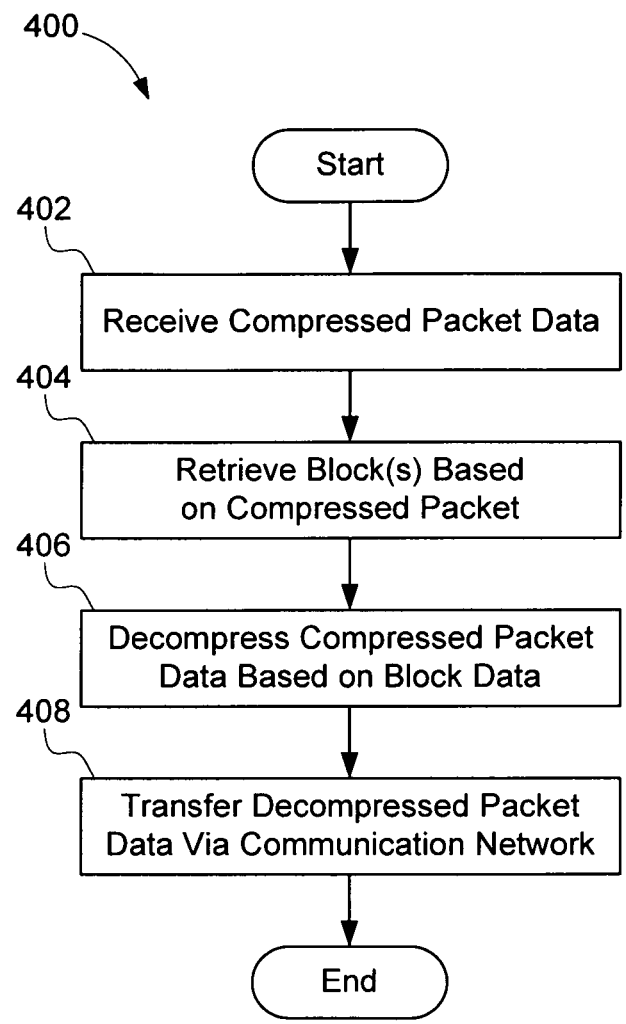
FIG. 4 is a flowchart showing a method for decompressing packet data according to exemplary embodiments.

FIG. 4 is a flowchart showing a method 400 for decompressing packet data according to exemplary embodiments. The method 400 may be performed by the network memory device 108 or by modules therein, as described below. Moreover, steps of this method may be performed in varying orders or concurrently. Various steps may be added, subtracted, or combined in the method 400 and still fall within the scope of the present invention.

In step 402, a compressed packet comprising compressed packet data is received. According to exemplary embodiments, the compressed packet may be received by the network memory device 108 via a communication network. For example, if the computer 106A sent a packet directed to the computer 106B that was intercepted, compressed, and transferred by the network memory device 108A (see FIG. 3), the compressed packet may be received by the interface module 202 of the network memory device 108B. In such an example, packet data from the packet may traverse the local area network 110A, the wide area network 104, and the local area network 110B prior to being received by the network memory device 108A. In out-of-path configurations, the network memory device 108 may intercept the compressed packet as it flows through the communication network.

In step 404, one or more blocks are retrieved based on the compressed packet. As mentioned previously, the compressed packet may comprise the compressed version of the packet data originally included in the packet as well as information to identify the one or more blocks on which the compression of the packet data was, at least partially, based. The one or more blocks may be retrieved based on information included in the compressed packet that identifies the one or more blocks. In exemplary embodiments, the one or more blocks retrieved in step 404 will be identical to the one or more blocks on which the compression of the packet was based in step 306. The sameness of these blocks may be insured by a background synchronization process between network memory devices 108 in accordance with exemplary embodiments. Additionally, if sub-blocks were used to compress the packet, then identical sub-blocks may be similarly retrieved. According to some embodiments, one or more of data structures (e.g., hash tables), dictionaries, or caches as described in connection with step 304 may be used in retrieving the one or more blocks.

In step 406, the compressed packet data is decompressed based on the one or more blocks. Packet data identical to the packet data as originally intercepted may be generated from the decompressed packet data. In exemplary embodiments, a reciprocal method to that applied for compression of the packet data may be used to decompress the compressed packet data. For example, if the packet data was compressed as described in step 306 of FIG. 3 using a particular method or technique, a reciprocal of that particular method or technique may be used for decompression. It will be appreciated that the network memory devices 108A and 108B may use consistent methods or techniques for compression and decompression.

In step 408, the decompressed packet data is transferred via the communication network. As mentioned, the communication network may comprise one or more of a local area network (e.g., local area networks 110A and 110B) and a wide area network (e.g., the wide area network 104). For example, if the compressed packet data was decompressed by the compression/decompression engine 206 of the network memory device 108B, then the decompressed packet data may be transferred to the computer 106B via the local area network 110B. Resultantly, the decompressed packet data received by the computer 106B will be indistinguishable from the packet data of the packet originally sent from the computer 106A due to the transparent operation of the network memory devices 108A and 108B in exemplary embodiments. Furthermore, the packet data may or may not be divided into packets with identical lengths and header information relative to the packets as originally intercepted.

Figure 5:
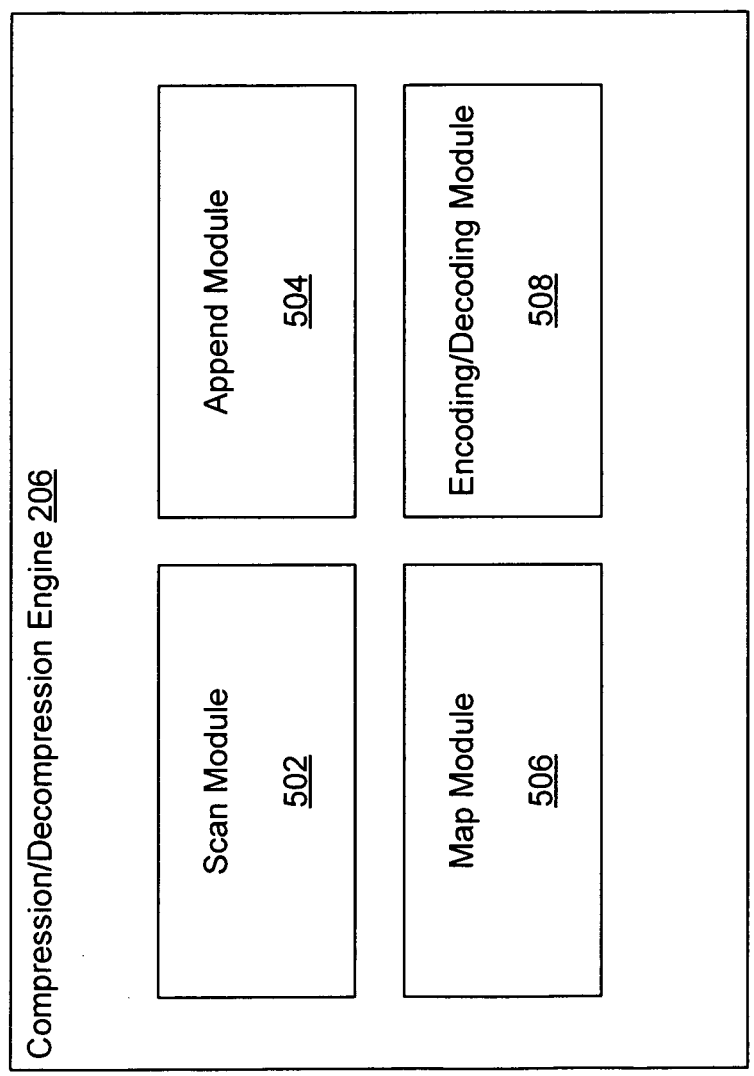
FIG. 5 illustrates an exemplary compression/decompression engine.

FIG. 5 illustrates the compression/decompression engine 206 in accordance with exemplary embodiments. The compression/decompression engine 206 may include a scan module 502, an append module 504, a map module 506, and an encoding/decoding module 508. Although FIG. 5 describes the compression/decompression engine 206 as including various modules, fewer or more modules may be included in the compression/decompression engine 206 and still fall within the scope of various embodiments. Additionally, various modules of the compression/decompression engine 206 may be combined into a single module. For example, functionalities of the scan module 502, the map module 506, and the encoding/decoding module 508 may be combined into one module.

The scan module 502 is configured to scan the packet data part-by-part, for example, to generate one or more data structures, such as hash tables, for use in mapping. The scan module 502 may also identify the block data similar to the packet data, as described in step 304. In one embodiment, parts may comprise every combination of three consecutive bytes in the packet data. In other embodiments, other methods for scanning may be implemented by the scan module 502. The parts may have a minimum and/or maximum size according to some embodiments. Additionally, the parts may be defined by words or other groupings of data. The parts may comprise nonconsecutive bytes and/or be overlapping.

In some embodiments, block data, such as those stored by the network memory module 204, are also scanned by the scan module 502. The block data may be scanned prior to, concurrently with, or subsequent to the scanning of the packet data. Furthermore, the scan module 502 may also maintain other hash tables that may be used to correlate packet data and block data.

In exemplary embodiments, the scan module 502 may generate one or more data structures (e.g., hash tables) associated with the packet and/or the block. Generally speaking, hashing is used to convert an identifier or key (e.g., one of the parts) into a value or 'hash' for a location of corresponding data in a structure (e.g., the packet and/or the block). A hashing function may be used to convert the key into the hash. To illustrate, an exemplary hashing function may add up ASCII values of characters in the key, divide the total by 127, and take the remainder. If this hashing function is applied to a given key, 'mouse,' the corresponding hash would be twelve. Accordingly, data identified by 'mouse' would be found among items associated with a hash equal to twelve in a hash table. Those skilled in the art will be familiar with hashing functions, hash tables, and other hashing concepts. In exemplary embodiments, the one or more hash tables associated with the packet, the packet data, and/or the block may be stored in the network memory, a cache, or other storage.

The append module 504 is configured to append packet data from one or more packets to block data from one or more blocks that contains data similar to the packet data. The append module 504 may be configured to append the packet data physically or virtually, in accordance with various embodiments. Physically appending the packet data may comprise joining the packet data and the one or more blocks within memory. Virtually appending the packet data may comprise providing pointers to the one or more blocks after the one or more blocks are identified.

The map module 506 is configured to map portions of the packet data to locations within the block data where the portions are duplicated. In exemplary embodiments, the portions may be consecutive bytes that are duplicated in both the packet data and the block data. The portions may be identified based on the data structures generated by the scan module 502. In some embodiments, the portions of the packet data are also mapped within the packet data, itself. The map module 506 may determine a length of each of the portions being mapped as well as a corresponding distance from each of the portions to the locations that each of the portions are mapped to. These lengths and distances may comprise length-distance pairs. In exemplary embodiments, the map module 506 may use the one or more hash tables generated by the scan module 502 in order to map the portions.

The encoding/decoding module 508 is configured to encode the packet data. The encoding/decoding module 508 may encode the packet data by replacing the portions that were mapped by the map module 506 with corresponding length and distance information. Furthermore, the encoding/decoding module 508 may add information to the packet data to identify the one or more blocks that include the block data that was appended to the packet data by the append module 504 and used by the map module 506. Thus, according to exemplary embodiments, encoded packet data generated by the encoding/decoding module 508 may comprise a block indicator and one or more length-distance pairs. In some embodiments, the encoded packet data may further comprise literal information and information associated therewith. Literal information may comprise packet data that was not mapped by the map module 506 and consequently not replaced by a length-distance pair by the encoding/decoding module 508.

In addition to encoding the packet data, the encoding/decoding module 508 may be configured to decode encoded packet data. Generally, decoding encoded packet data is achieved by a reciprocal process relative to the process used to encode the packet data. For example, the encoding/decoding module 508 may identify the one or more blocks from which the block data was used to encode the packet data based on the block indicator included in the encoded packet data. Then, using the length-distance pairs included in the encoded packet data in conjunction with the block data from the one or more blocks, the encoding/decoding module 508 may reconstruct the packet data.

Figure 6A:
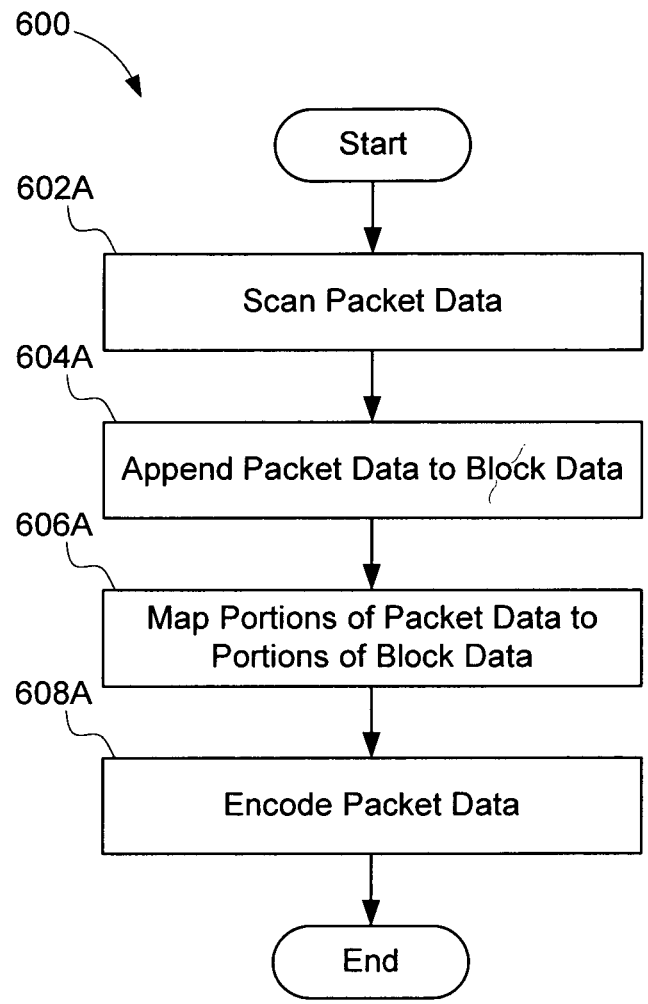
FIG. 6A is a flowchart showing a method for compressing packet data in accordance with exemplary embodiments.

FIG. 6A is a flowchart showing an exemplary method 600 for compressing packet data based on block data, such as in step 306 shown in FIG. 3. The method 600 may be performed by the network memory device 108 or by modules therein, as described below. In addition, steps of the method 600 may be performed in varying orders or concurrently. For example, steps 602A-606A may occur simultaneously. Additionally, various steps may be added, subtracted, or combined in the method 600 and still fall within the scope of the present invention.

In step 602A, packet data is scanned part-by-part to generate one or more data structures (e.g., a hash table). According to exemplary embodiments, the packet data may be scanned by the scan module 502. Additionally, one or more blocks may be identified containing similar data to the packet data. As previously mentioned, the one or more blocks may be identified based on one or more hash tables associated with the one or more blocks, or block data therefrom, in conjunction with the one or more hash tables associated with the packet data.

In step 604A, the packet data is appended to block data from the one or more blocks identified in step 602A. The packet data may be appended by the append module 504 in exemplary embodiments. The packet data may be appended either physically or virtually, as discussed herein.

In step 606A, portions of the packet data are mapped to the block data from the one or more blocks in network memory. The map module 506 may perform step 606A in exemplary embodiments. The portions of the packet data may be mapped to locations within the block data where the portions are duplicated. In some embodiments, the portions of the packet data may also be mapped within the packet data, itself. The length of each of the portions being mapped as well as the corresponding distance from each of the portions to the locations that each of the portions are mapped to may also be determined. These lengths and distances may comprise length-distances pairs. Some of the portions within the packet data may not be mapped in step 606A. For example, if a certain portion is not duplicated in the block data or if the certain portion is too short, the certain portion may not be mapped.

In step 608A, the packet data is encoded. According to various embodiments, the encoding/decoding module 508 may perform step 608A. The packet data may be encoded or compressed by replacing the portions that were mapped in step 606A with corresponding length and distance information. Additionally, portions in the packet data that are not mapped in step 606A may be included in the encoded packet data as 'literals.' Furthermore, information may be added to the encoded packet data to identify the one or more blocks that include the block data that was appended to the packet data in the appending step 604A.

Figure 6B:
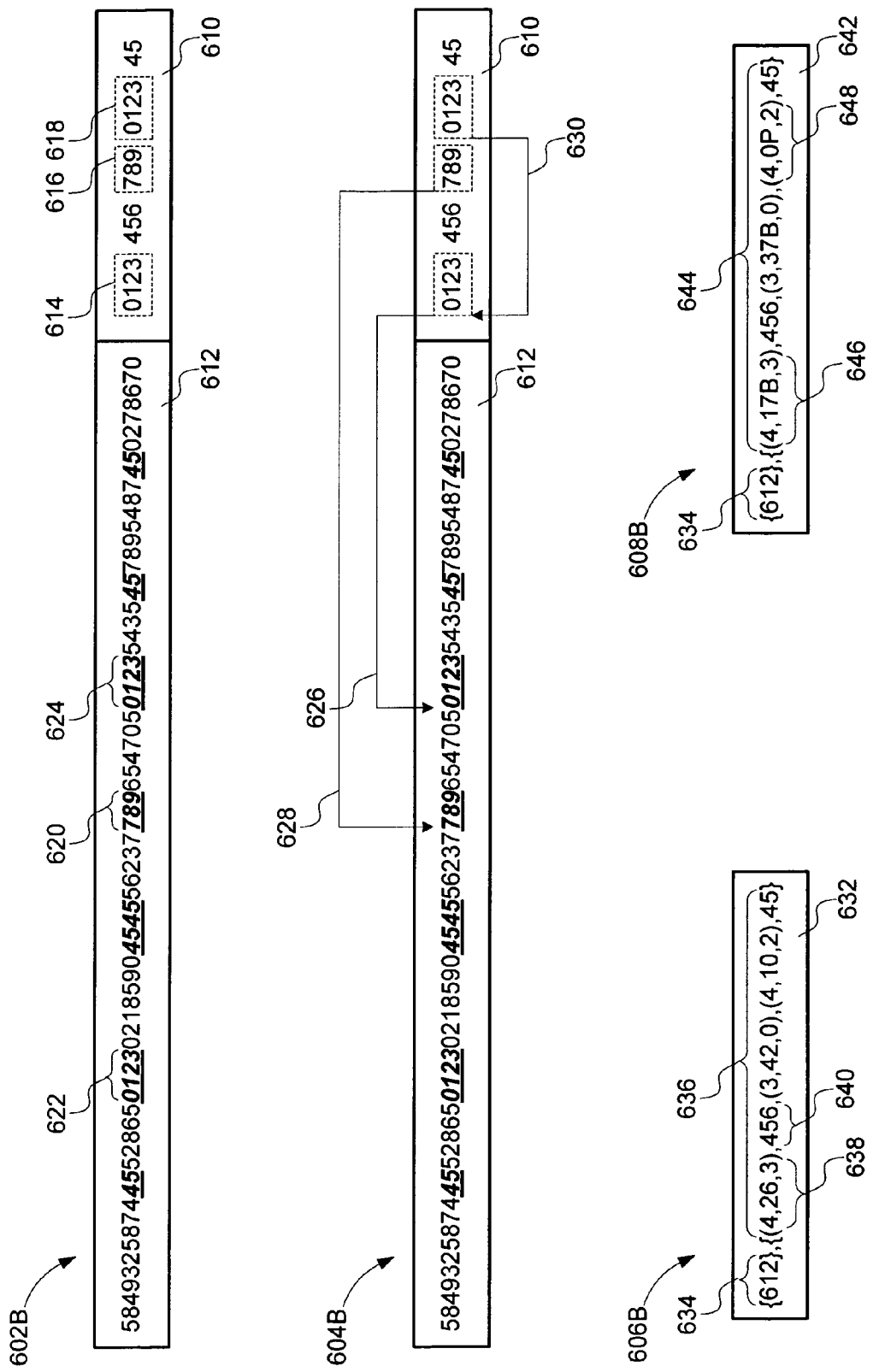
FIG. 6B illustrates an exemplary implementation of the method presented in FIG. 6A.

FIG. 6B illustrates an exemplary implementation of the method 600 presented in FIG. 6A. This implementation may be performed by the network memory device 108 or by modules therein, as described below. In addition, implemental steps of this method may be performed in varying orders or concurrently. For example, steps 602B-606B may occur simultaneously. Additionally, various implemental steps may be added, subtracted, or combined in the implementation of the method 600 and still fall within the scope of the present invention.

Implemental step 602B may correspond to steps 602A and 604A according to various embodiments. In implemental step 602B, packet data 610 is scanned to identify various portions. The packet data 610 may comprise data from one or more packets. In exemplary embodiments, one or more hash tables associated with the packet data 610 may be generated based on the scanning of the packet data 610 by the scan module 502. Block data 612 comprising data from one or more blocks may also be scanned prior to, concurrently with, or subsequent to the scanning of the packet data 610 in accordance with various embodiments. Furthermore, one or more hash tables associated with the block data 612 may be generated. Other hash tables may be generated and utilized to correlate the one or more hash tables associated with the packet data 610 and the one or more hash tables associated with the block data 612, in accordance with some embodiments. These other hash tables may be generated prior to, or concurrently with, implementation step 602B and be stored in a cache or in network memory.

Also in implemental step 602B, the packet data 610 is appended to block data 612, which may be accomplished by performing the step 604A. For illustrative purposes, the packet data 610 and the block data 612 are depicted as including series of numbers, but may also include words, characters, letters, binary data, and various other data. Additionally, the packet data 610 is shown as having a length of sixteen characters, but may have any length according to various embodiments. Similarly, the block data 612 is shown as having a length of seventy two characters, but may also have any length in various embodiments. Generally, however, the block data 612 will be much longer that the packet data 610.

As discussed in connection with step 604A, the packet data 610 may be physically appended to the block data 612 or virtually appended to the block data 612. As shown, the packet data 610 is physically appended to the block data 612. In accordance with various embodiments, the packet data 610 may be appended at the beginning or end of the block data 612. Additionally, as discussed herein, the block data 612 may be identified based on the one or more hash tables associated with the block data 612 in conjunction with the one or more hash tables generated based on the scan of the packet data 610 in step 602A.

In implemental step 604B, portions 614, 616, and 618 of the packet data 610 are mapped to portions 624, 620, and 614, respectively, of the block data 612 and the packet data 610. The implemental step 604B may be accomplished by performing the step 606A. A mapping line 626 indicates a position in the block data 612 that the portion 614 is mapped to. Similarly, mapping lines 628 and 630 indicate positions to which the portions 616 and 618, respectively, are mapped to. In the present example, the mapping lines 626, 628, and 630 have distances equal to twenty six characters, forty two characters, and ten characters, respectively.

Note that many instances of '0123' are included in the packet data 610 and the block data 612, however, both the portion 614 and the portion 618 are mapped to the nearest instance preceding the portions 614 and 618 (i.e., the portions 624 and 614). Additionally, some portions of the packet data 610 are not mapped (i.e., '456' and '45') due to shortness of length or absence of duplicity in the block data 612. It is noted that the mapping scheme depicted in implemental step 604B is exemplary and other mapping schemes may be used and still fall within the scope of various embodiments.

In implemental step 606B, the packet data 610 is encoded into encoded packet 632. The implemental step 606B may be accomplished by performing the step 608A. The encoded packet 632 may comprise a block indicator 634 and a code section 636. Although the encoded packet 632 is depicted as comprising a tuple, the encoded packet 632 may take many different forms according to various embodiments, such as discussed in connection with implemental step 608B. Furthermore, variable length encoding, such as Huffman coding, may be invoked in some embodiments.

The block indicator 634 indicates which block or blocks were used to encode the packet data 610. As depicted, the block data 612 was used to encode the packet data 610. The block indicator 634 may be used by the network memory device 108 that receives the encoded packet 632 to identify the block data 612 in order to decode the encoded packet 632.

The code section 636 may comprise one or more coded portions, such as a coded portion 638, as well as literals, such as literal 640. In the coded portion 638, the first two values comprise a length-distance pair. For example, in the length-distance pair of the coded portion 638, the first value (i.e., '4') indicates the length of the portion 614 of the packet data 610. The second value of the length distance pair (i.e., '26') specifies the distance from the portion 614 of the packet data 610 to the portion 624 of the block data 612. The third value of the coded portion 638 may indicate a length of a literal that follows the coded portion 638. Since the literal 640 has a length of three characters, the third value of the coded portion 638 is '3.'

In implemental step 608B, an alternate encoding scheme is used to encode the packet data 610 to generate encoded packet 642, in accordance with various embodiments. The encoded packet 642 may comprise a block indicator 634 and a code section 644. Again, the block indicator 634 indicates which block or blocks were used on encode the packet data 610.

The code section 644 may comprise one or more coded portions, such as a coded portion 646 and coded portion 648, as well as various literals. In the coded portions 646 and 648, the first two values comprise a length-distance pair in an alternate form as that described in connection with implemental step 606B. In the length-distance pair of the coded portion 646, the first value (i.e., '4') indicates the length of the portion 614 of the packet data 610. The second value of the length distance pair in the coded portion 646 (i.e., '17B,' wherein 'B' indicates 'Block') specifies the distance from the beginning of the block data 612 to the portion 622. The third value of the coded portion 646 indicates a length of a literal that follows the coded portion 646. In the length-distance pair of the coded portion 648, the first value (i.e., '4') indicates the length of the portion 618 of the packet data 610. The second value of the length distance pair in the coded portion 648 (i.e., '0P,' wherein 'P' indicates 'Packet') specifies the distance from the beginning of the packet data 610 to the portion 614. The third value of the coded portion 648 indicates a length of a literal that follows the coded portion 648.

Figure 7:
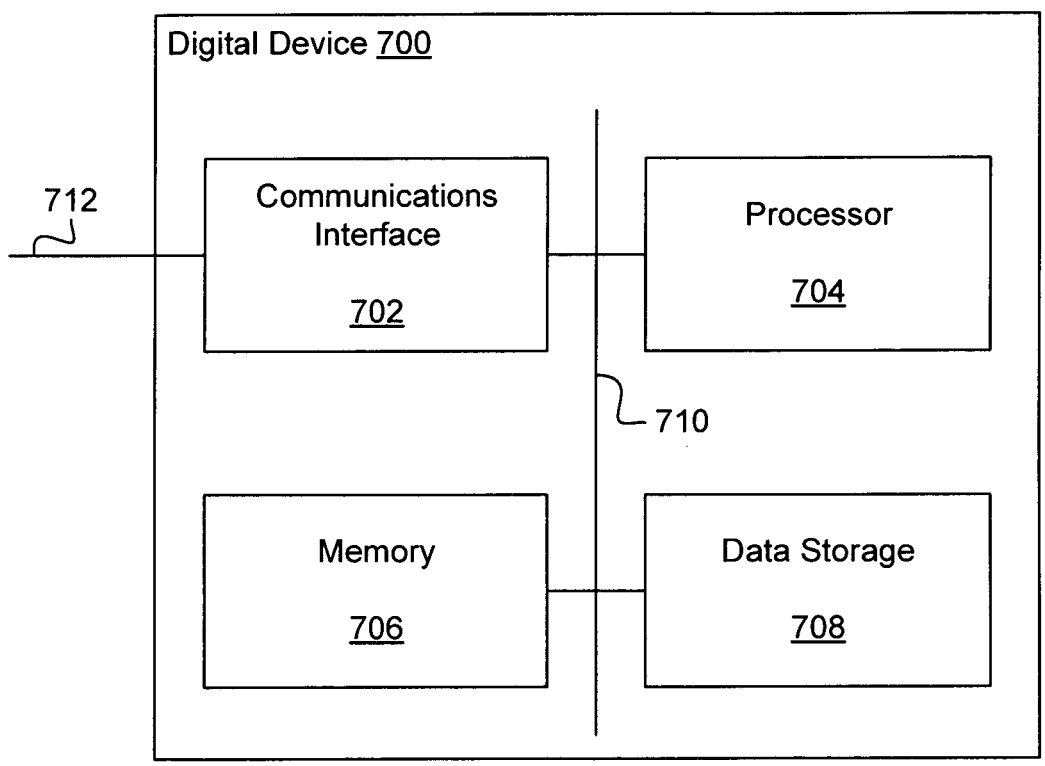
FIG. 7 illustrates an exemplary network device.

FIG. 7 illustrates an exemplary digital device 700. The digital device 700 may comprise a network memory device such as the network memory device 108. The digital device 700 includes a communications interface 702, a processor 704, memory 706, and data storage 708. A system bus 710 links the communications interface 702, the processor 704, the memory 706, and the data storage 708. Line 712 links the communications interface 702 to the communication network (e.g., the local area network 110A, the local area network 110B, and the wide area network 104).

The communications interface 702 may couple the digital device 700 to any type of communication network. In one example, the communications interface 702 is coupled to a local area network. In another example, the communications interface 702 is coupled to the Internet or wide area network (e.g., the wide area network 104). Additionally, the communications interface 702 may wirelessly couple the digital device 700 to the communication network.

The processor 704 may be operational to retrieve and execute instructions that comprise the methods and functions described herein. The instructions may be embodied on and retrieved from a computer readable storage medium such as the memory 706 and the data storage 708. Some examples of instructions are software, program code, and firmware. The instructions are operational when executed by the processor to direct the processor to operate in accord with the invention. Those skilled in the art are familiar with instructions, processor(s), and computer readable storage media.

The memory 706 may comprise volatile memory to temporarily store information such as various packets and blocks. The memory 706 typically comprises random-access memory (RAM). The memory 706 may comprise the storage module 208 in accordance with some embodiments.

The data storage 708 comprises non-volatile memory to persistently store information such as various packets and blocks such that the information stored in the data storage 708 can be retrieved later. The data storage 708 may comprise magnetic media such as a disk, EEPROM, and/or the like. In some embodiments, the data storage 708 may comprise the storage module 208.

The above-described modules may be comprised of instructions that are stored in storage media such as a machine readable medium (e.g., a computer readable medium). The instructions may be retrieved and executed by a processor such as the processor 704. Some examples of instructions include software, program code, and firmware. Some examples of storage media comprise memory devices and integrated circuits. The instructions are operational when executed by the processor 704 to direct the processor 704 to operate in accordance with embodiments of the present invention. Those skilled in the art are familiar with instructions, processors, and storage media.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for compressing packets, comprising:
identifying block data from one or more blocks that include data similar to packet data from one or more packets, the block data comprising archives of previously transferred data;
appending the packet data to the identified block data that includes data similar to the packet data and using Lempel-Ziv (LZ) based encoding on the identified block data and the packet data that has been appended to the block data to generate compressed packet data, wherein the encoding and compressing is based at least in part on the identified block data similar to the packet data and wherein the compressed packet data comprises a block indicator and an encoded portion comprising at least one length-distance pair; and
transferring the compressed packet data over a communication network.

2. The method of claim 1, further comprising intercepting the one or more packets after the one or more packets are sent from a computing device.

3. The method of claim 1, wherein the one or more blocks are stored in a network memory.

4. The method of claim 1, further comprising dividing the one or more blocks into sub-blocks.

5. The method of claim 1, wherein the compressing comprises identifying one or more portions of the packet data that match one or more portions of the block data.

6. The method of claim 1, further comprising generating one or more data structures associated with the packet data and the block data.

7. The method of claim 6, wherein the one or more data structures are stored in a cache.

8. The method of claim 1, wherein the compressing is further based on identifying similar data within the packet data itself.

9. The method of claim 1, further comprising building a dictionary based on the one or more blocks.

10. The method of claim 1, further comprising:
receiving the compressed packet data;
retrieving the one or more blocks based at least in part on the block indicator in the compressed packet data; and
decompressing the compressed packet data based at least in part on the block data from the one or more blocks and the at least one length-distance pair in the compressed packet data.

11. The method of claim 10, wherein the decompressing comprises Lempel-Ziv (LZ) based decoding.

12. A system for compressing packets, comprising:
a network memory module executable by a processor and configured to store blocks in a memory, the blocks comprising archives of previously transferred data;
a compression-decompression engine configured to identify block data from one or more blocks that include data similar to packet data from one or more packets, and to append the packet data to the identified block data that includes data similar to the packet data and use Lempel-Ziv (LZ) based encoding on the identified block data and the packet data that has been appended to the identified block data to generate compressed packet data, wherein the encoding and compressing is based at least in part on the identified block data similar to the packet data and wherein the compressed packet data comprises a block indicator and an encoded portion comprising at least one length-distance pair; and
an interface module configured to transfer the compressed packet data over a communication network.

13. The system of claim 12, wherein the interface module is further configured to intercept the one or more packets after the one or more packets are sent from a computer.

14. The system of claim 12, wherein the compression-decompression engine is further configured to divide the one or more blocks into sub-blocks.

15. The system of claim 12, wherein the compression-decompression engine comprises a scan module configured to scan the packet data to generate data structures associated with the packet data.

16. The system of claim 15, wherein the scan module is further configured to generate one or more data structures associated with the packet data and the block data.

17. The system of claim 12, wherein the compression-decompression engine further comprises a map module configured to map portions of the packet data to locations with similar data within the block data and determine at least one length-distance pair comprising a length of each portion mapped and a distance from each of the portions in the packet data to the mapped location in the block data.

18. The system of claim 12, wherein the compression-decompression engine comprises an encoding-decoding module configured to perform LZ based encoding and LZ based decoding.

19. The system of claim 12, wherein the compression-decompression engine is further configured to compress the packet data based on identifying similar data within the packet data itself.

20. The system of claim 12, wherein the interface module is further configured to receive compressed packet data; and wherein the compression-decompression engine is further configured to retrieve the one or more blocks based at least in part on the block indicator in the compressed packet data and to decompress the compressed packet data based at least in part on the block data from the one or more blocks and the at least one length-distance pair in the compressed packet data.

21. A non-transitory machine readable medium having embodied thereon a program, the program providing instructions for a method for compressing packets, the method comprising:

identifying block data from one or more blocks that include data similar to packet data from one or more packets, the block data comprising archives of previously transferred data;

appending the packet data to the identified block data that includes data similar to the packet data and using Lempel-Ziv (LZ) based encoding on the identified block data and the packet data that has been appended to the identified block data to generate compressed packet data, wherein the encoding and compressing is based at least in part on the identified block data similar to the packet data and wherein the compressed packet data comprises a block indicator and an encoded portion comprising at least one length-distance pair; and transferring the compressed packet data over a communication network.

* * * * *